United States Patent
Clem et al.

(10) Patent No.: US 7,782,849 B2
(45) Date of Patent: *Aug. 24, 2010

(54) DATA SWITCH AND SWITCH FABRIC

(75) Inventors: Shaun Clem, Thousand Oaks, CA (US); Todd Khacherian, Moorpark, CA (US); Darrin McGavin Patek, Thousand Oaks, CA (US); John Wallner, Agoura Hills, CA (US)

(73) Assignee: Forestay Research, LLC, Denver, CO (US)

(*) Notice: Subject to any disclaimer, the term of this patent is extended or adjusted under 35 U.S.C. 154(b) by 302 days.

This patent is subject to a terminal disclaimer.

(21) Appl. No.: 11/772,787

(22) Filed: Jul. 2, 2007
(Under 37 CFR 1.47)

(65) Prior Publication Data

US 2008/0013535 A1    Jan. 17, 2008

Related U.S. Application Data

(63) Continuation of application No. 09/971,049, filed on Oct. 3, 2001, now Pat. No. 7,362,751.

(51) Int. Cl.
*H04L 12/28* (2006.01)
*G06F 15/173* (2006.01)

(52) U.S. Cl. .............. 370/389; 370/358; 370/380; 370/395.72; 370/413; 370/473; 709/236; 709/238; 709/242; 709/244

(58) Field of Classification Search ........ 370/228–503; 709/236–244
See application file for complete search history.

(56) References Cited

U.S. PATENT DOCUMENTS

| | | | |
|---|---|---|---|
| 4,330,824 A | 5/1982 | Girard | |
| 4,394,725 A | 7/1983 | Bienvenu et al. | |
| 4,704,606 A * | 11/1987 | Hasley | 370/381 |
| 4,740,954 A | 4/1988 | Cotton et al. | |
| 4,754,451 A | 6/1988 | Eng et al. | |

(Continued)

OTHER PUBLICATIONS

PetaSwitch Solutions, Inc., The Pisces Chipset, Product Brief, 2001, http://www.peta-switch.com/products/product_brief.htm.

(Continued)

*Primary Examiner*—Ayaz R Sheikh
*Assistant Examiner*—Venkatesh Haliyur
(74) *Attorney, Agent, or Firm*—SoCal IP Law Group LLP; Steven C. Sereboff; John E. Gunther

(57) ABSTRACT

Variable length switch fabric for switching variable length data packets between input and output transmission paths in a communication network. In one embodiment of the invention, apparatus is provided for switching variable length data packets between input and output transmission paths in a communication network. The apparatus includes a plurality of input ports coupled to receive the plurality of variable length data packets from the input transmission paths and a plurality of output ports coupled to transmit the plurality of variable length data packets on the output transmission paths. The apparatus also includes a variable length switch fabric coupled to the plurality of input ports and the plurality of output ports, the variable length switch fabric operates to switch the plurality of variable length data packets from selected input ports to selected output ports in an unsegmented form.

27 Claims, 7 Drawing Sheets

U.S. PATENT DOCUMENTS

| | | | |
|---|---|---|---|
| 5,367,643 A | | 11/1994 | Chang et al. |
| 5,432,908 A | * | 7/1995 | Heddes et al. ............... 370/412 |
| 5,550,823 A | | 8/1996 | Irie et al. |
| 5,555,543 A | | 9/1996 | Grohoski |
| 5,606,370 A | | 2/1997 | Moon |
| 5,768,257 A | * | 6/1998 | Khacherian et al. ......... 370/229 |
| 5,845,145 A | | 12/1998 | James |
| 5,860,085 A | | 1/1999 | Stormon et al. |
| 5,872,769 A | * | 2/1999 | Caldara et al. ............... 370/230 |
| 5,898,689 A | | 4/1999 | Kumar et al. |
| 5,905,911 A | | 5/1999 | Shimizu |
| 5,909,440 A | | 6/1999 | Ferguson et al. |
| 5,923,893 A | | 7/1999 | Moyer et al. |
| 5,982,749 A | | 11/1999 | Daniel et al. |
| 5,995,507 A | * | 11/1999 | Fujita .................... 370/395.71 |
| 6,003,060 A | * | 12/1999 | Aznar et al. ................ 718/103 |
| 6,026,092 A | | 2/2000 | Abu-Amara et al. |
| 6,031,843 A | | 2/2000 | Swanbery et al. |
| 6,044,061 A | | 3/2000 | Aybay |
| 6,067,408 A | | 5/2000 | Runaldue et al. |
| 6,138,185 A | | 10/2000 | Nelson |
| 6,172,927 B1 | | 1/2001 | Taylor |
| 6,285,675 B1 | * | 9/2001 | Sakurai et al. ............... 370/391 |
| 6,389,489 B1 | | 5/2002 | Stone |
| 6,460,120 B1 | | 7/2002 | Bass et al. |
| 6,442,674 B1 | | 8/2002 | Lee et al. |
| 6,493,347 B2 | * | 12/2002 | Sindhu et al. ............... 370/401 |
| 6,501,757 B1 | * | 12/2002 | Kamaraj et al. ......... 370/395.41 |
| 6,542,507 B1 | * | 4/2003 | Khacherian et al. .... 370/395.43 |
| 6,570,876 B1 | * | 5/2003 | Aimoto ...................... 370/389 |
| 6,574,194 B1 | | 6/2003 | Sun et al. |
| 6,574,232 B1 | | 6/2003 | Honig et al. |
| 6,597,696 B1 | | 7/2003 | Toyama |
| 6,600,741 B1 | * | 7/2003 | Chrin et al. ................. 370/375 |
| 6,687,768 B2 | | 2/2004 | Horikomi |
| 6,704,794 B1 | * | 3/2004 | Kejriwal et al. ............. 709/236 |
| 6,724,759 B1 | * | 4/2004 | Chang et al. ................ 370/389 |
| 6,731,631 B1 | * | 5/2004 | Chang et al. ................ 370/388 |
| 6,735,219 B1 | | 5/2004 | Clauberg |
| 6,754,741 B2 | * | 6/2004 | Alexander et al. ............ 710/52 |
| 6,760,346 B1 | * | 7/2004 | Suemura et al. ............. 370/504 |
| 6,781,986 B1 | * | 8/2004 | Sabaa et al. ................. 370/389 |
| 6,795,870 B1 | | 9/2004 | Bass et al. |
| 6,804,731 B1 | * | 10/2004 | Chang et al. .................. 710/53 |
| 6,836,479 B1 | * | 12/2004 | Sakamoto et al. ........... 370/389 |
| 6,842,443 B2 | | 1/2005 | Allen, Jr. et al. |
| 6,882,589 B2 | | 4/2005 | Bailey |
| 6,907,041 B1 | | 6/2005 | Turner |
| 6,934,253 B2 | * | 8/2005 | Hoogenboom et al. ...... 370/232 |
| 6,967,951 B2 | | 11/2005 | Alfano |
| 6,977,941 B2 | * | 12/2005 | Takahashi et al. ........... 370/412 |
| 6,987,760 B2 | * | 1/2006 | Calvignac et al. ........... 370/369 |
| 6,993,014 B2 | | 1/2006 | Bedingfield et al. |
| 6,993,041 B2 | * | 1/2006 | Yamamoto ................... 370/413 |
| 7,046,660 B2 | * | 5/2006 | Wallner et al. .............. 370/386 |
| 7,058,053 B1 | | 6/2006 | Schober |
| 7,068,603 B2 | * | 6/2006 | Rashid et al. ................ 370/235 |
| 7,123,623 B2 | * | 10/2006 | Sharma et al. .............. 370/413 |
| 7,130,308 B2 | * | 10/2006 | Haddock et al. ............. 370/423 |
| 7,324,537 B2 | * | 1/2008 | Samudrala et al. .......... 370/412 |
| 7,362,751 B2 | * | 4/2008 | Khacherian et al. ......... 370/389 |
| 2001/0037435 A1 | | 11/2001 | Van Doren |
| 2001/0053157 A1 | | 12/2001 | Li |
| 2002/0054568 A1 | * | 5/2002 | Hoogenboom et al. ... 370/235.1 |
| 2002/0165947 A1 | | 11/2002 | Akerman et al. |
| 2003/0035427 A1 | | 2/2003 | Alasti et al. |
| 2003/0088694 A1 | * | 5/2003 | Patek et al. .................. 709/238 |
| 2003/0118058 A1 | | 6/2003 | Kim |
| 2003/0188062 A1 | | 10/2003 | Luse |
| 2006/0165070 A1 | * | 7/2006 | Hall et al. .................... 370/369 |

OTHER PUBLICATIONS

PetaSwitch Solutions, Inc., PetaSwitch Solutions Announces Raising $4 Million in First Round Financing, Press Release, 2001, http://peta-switch.com/newsroom/press_releases.htm.

Gupta, Scheduling in Input Queued Switches: A Survey, Jun. 1996, Department of Computer Science, Stanford University, California.

Prabhakar, et al., Designining a Multicast Switch Scheduler, 1995, Computer Systems Lab Technical Report, Stanford University.

Schoenen, et al., Distributed Cell Scheduling Algorithms for Virtual-Output-Queued Switches, Dec. 1999, pp. 1211-1215, vol. 1, GLOBECOM, IEEE Global Telecommunications Conference.

Fahmy, A Survey of ATM Switching Techniques, Aug. 14, 2001, Department of Computer and Information Science, The Ohio State University.

Stilliadis, et al., Rate-Proportional Servers: A Design Methodology for Fair Queueing Algorithms, Dec. 1995, Computer Engineering & Information Sciences, University of California, Santa Cruz.

Stoica, et al., Earliest Eligible Virtual Deadline First: A Flexible and Accurate Mechanism for Proportional Share Resource Allocation, Department of Computer Science, Old Dominion University, Norfolk, VA.

* cited by examiner

DATA SWITCH AND SWITCH FABRIC

RELATED APPLICATION INFORMATION

This patent is a continuation of application Ser. No. 09/971,049 filed Oct. 3, 2001, now U.S. Pat. No. 7,362,751 B2, entitled Variable Length Switch Fabric.

FIELD OF THE INVENTION

The present invention relates generally to network switches, and more particularly, to a variable length switch fabric for use within a network switch.

BACKGROUND OF THE INVENTION

Communication networks require the use of network switching devices to switch or redirect data as it flows through the network. For example, data that is received at a network element may need to be switched from one transmission path to another so that the data can be routed to its final destination.

FIG. 1 shows a typical switching device 100 used to switch data between transmission paths in a communication network. The switching device 100 includes sixty-four input ports 102 to receive data to be switched. The switching device also includes sixty-four output ports 104 to output the switched data. Thus, the switching device 100 may be referred to as a sixty-four-port full-duplex switch.

Included in the switch device 100 is a fixed length switch fabric 106. The fixed length switch fabric is coupled to the input and output ports and operates to receive data input at a specific input port and to switch the data so that it is output at a specific output port. As a result, it is possible to switch the transmission path of the data. For example, data that is received by the fixed length switching fabric at port 0 may be switched and output at any output port, for example, port 2.

One requirement of the fixed length switching fabric 106 is that the received data be switched in fixed length portions or blocks. For example, the fixed length portion may be a block of fifty data bytes. This requirement may result in several disadvantages that are discussed in the following text.

Assuming that data packet X, shown at 110, is to be input to the switch 100 at port 0 and switched so that the packet X is output from output port 2. Further assume that packet X contains fewer than fifty bytes of data. In order to be switched by the fixed length switching fabric 106, the packet X will be padded, or zero-filled, until the total number of data bytes is equal to fifty. The zero-filled portion x1 is shown at 112. For the purpose of clarity the padding operation is shown being completed before the data enters the switch, however, in some cases the switch 100 may perform the padding operation internally. However, by padding the packet X to form a fifty-byte block, switch inefficiencies are introduced, since now the fixed length switch fabric 106 must switch the zero-filled portion of packet X. The switched packet, including the zero-filled portion is shown at 113 at the output of output port 2. By having to zero fill the packet and then switch the zero filled portion, switch performance is degraded and the available bandwidth of the switch fabric 106 is reduced.

Another problem associated with current fixed length switch fabrics involves the transmission of large data packets. For example, packet 114 represents a large data packet to be switched from port 1 to port 0. The packet 114 is much larger than the required fifty-byte block that is switched by the fixed length switch fabric 106. Another large packet 116 is to be switched from input port 2 to output port 0. The packet 116 is also greater than the required fifty-byte block that is switched by the fixed length switch fabric 106.

In order to switch such large data packets, a segmentation and reassembly (SAR) scheme is used. The SAR scheme involves segmenting the large data packets 114, 116 into smaller portions that are equivalent to the fixed length block size required by the switch, and then sending these smaller portions into the switch fabric. For example, packet 114 has been segmented into segments (or blocks) A, B, and C, where block A is sent into the switch fabric first followed by blocks B and C. Furthermore, since block C happens to be smaller that than fifty-byte block size, block C includes a zero-filled portion 118 so that block C will have a block size that can be switched by the fixed length switch fabric 106 (i.e., fifty bytes).

A similar process is performed on packet 116. Packet 116 is segmented into blocks D and E, where block E is zero-filled as shown at 120. Block D of packet 116 is first sent into the switch fabric followed by block E. Thus, the two packets 114, 116 are sent into the fabric 106 from input ports 1 and 2, respectively, and are both switched to output port 0.

By segmenting the packets 114, 116 and sending these segments into the switch fabric, all of the segments of packets 114, 116 will switch to the output port 0. Unfortunately, segmentation has the problem of re-assembly. To illustrate this, output data 122 represents the result of segmenting and switching packets 114, 116 using the fixed length switch fabric 106. As can be seen from data 122, the segmented blocks of packets 114, 116 are mixed together. For example, block A of packet 114 is followed by block D of packet 116. As a result, it is now required to reassemble the correct segment blocks so that the entire packets 114, 116 can be restored to their correct order and transmitted to their final destination.

In order to reassemble the various segment blocks of the packets 114 and 116, additional header information may have been added to each segment before being input to the switch. Then as the segments emerge from the switch 106, the header information can be used to reassemble the segments in the correct order to form the large data packets. However, the process of adding additional headers and reassembling the segments introduces inefficiencies in the form of wasted switch bandwidth and requires more resources in the form of storage memory. Thus, it can be clearly seen that using a fixed length switch fabric to switch both large and small data packets is very inefficient and results in problems that only grow worst as the transmission speed of the data network increases.

Therefore, what is needed is a system for switching variable length data packets that does not result in efficiencies introduced from zero filling and overcomes the problems resulting from segmentation and reassembly.

SUMMARY OF THE INVENTION

The present invention includes a variable length switch fabric for switching variable length data packets in a communication network. The variable length switch fabric allows data packets of different lengths to be received and switched without zero filling and without using a SAR scheme that is inefficient by wasting switch bandwidth and memory. The variable length switch fabric includes a strip memory that is used to buffer incoming data packets while they are being switched to a desired output port. An address pointer First-In-First-Out (FIFO) memory is used to allow the strip memory to be reused for storing different data packets. For example, once a received packet is switched and transmitted from a switch output port, the strip memory used to store the packet data may be reused to store new incoming packet data.

In this way, packets of varying length may be switched in an efficient manner without introducing the problems associated with zero filling or packet segmentation.

In one embodiment of the invention, apparatus for switching variable length data packets between input and output transmission paths in a communication network is provided. The apparatus includes a plurality of input ports coupled to receive the plurality of variable length data packets from the input transmission paths and a plurality of output ports coupled to transmit the plurality of variable length data packets on the output transmission paths. The apparatus also includes a variable length switch fabric coupled to the plurality of input ports and the plurality of output ports, the variable length switch fabric operates to switch the plurality of variable length data packets from selected input ports to selected output ports in an unsegmented form.

In one embodiment of the invention, a method for switching a plurality of variable length data packets between input and output transmission paths in a communication network is provided. The method includes the steps of receiving the plurality of variable length data packets from the input transmission paths, switching the plurality of variable length data packets in an unsegmented format to produce a plurality of switched variable length data packets, and transmitting the plurality of switched variable length data packets on the output transmission paths.

BRIEF DESCRIPTION OF THE DRAWINGS

The forgoing aspects and the attendant advantages of this invention will become more readily apparent by reference to the following detailed description when taken in conjunction with the accompanying drawings wherein.

DETAILED DESCRIPTION OF THE INVENTION

The present invention includes a variable length switch fabric for switching variable length data packets in a communication network. One or more embodiments included in the present invention will now be described in detail in the following text and accompanying drawings. Following the description of the embodiments, a method for providing a variable length switch fabric in accordance with the present invention will also be described.

Figure 1:
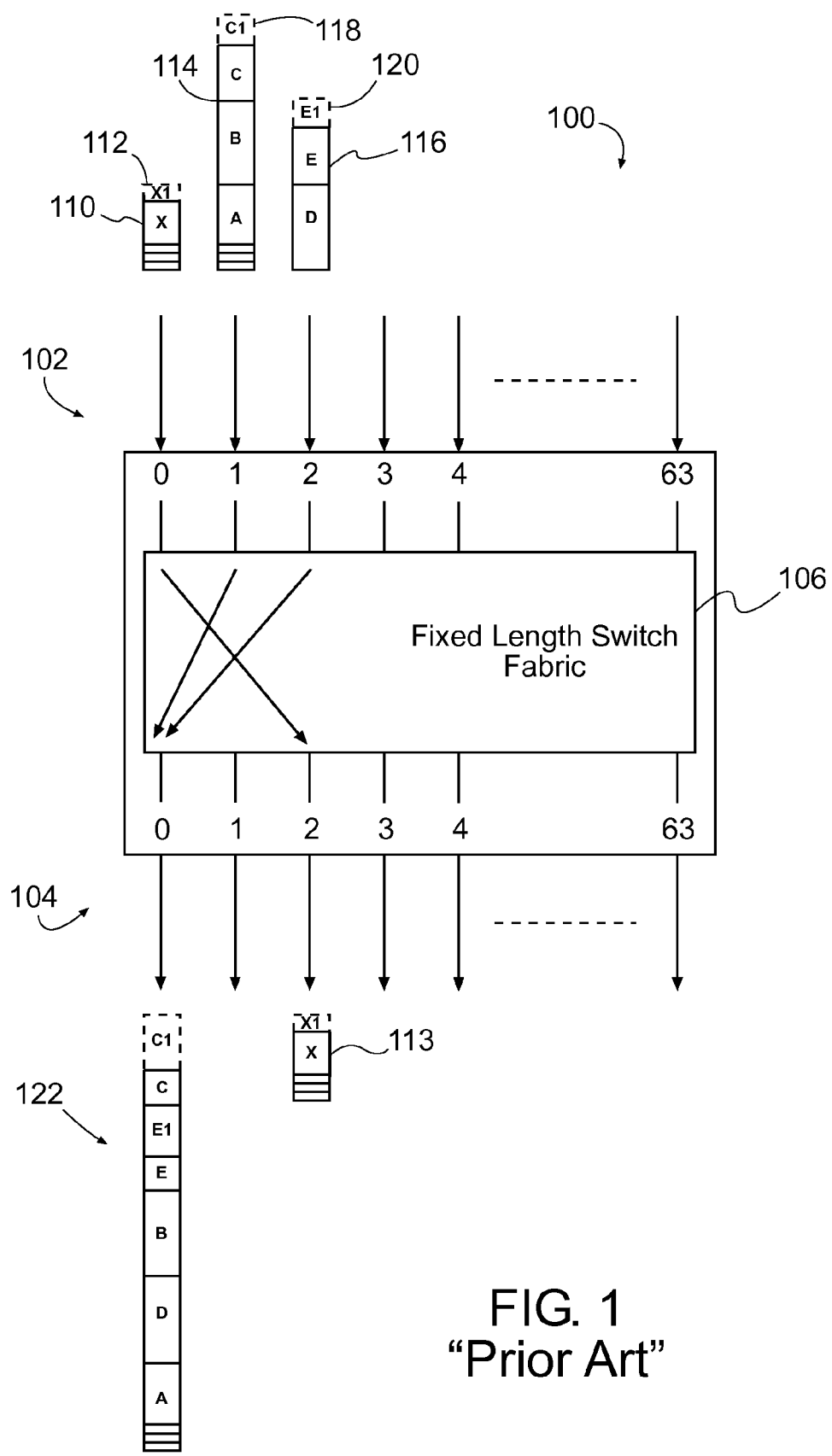
FIG. 1 shows a diagram of a typical switching device used to switch data in a data network.
Figure 2:
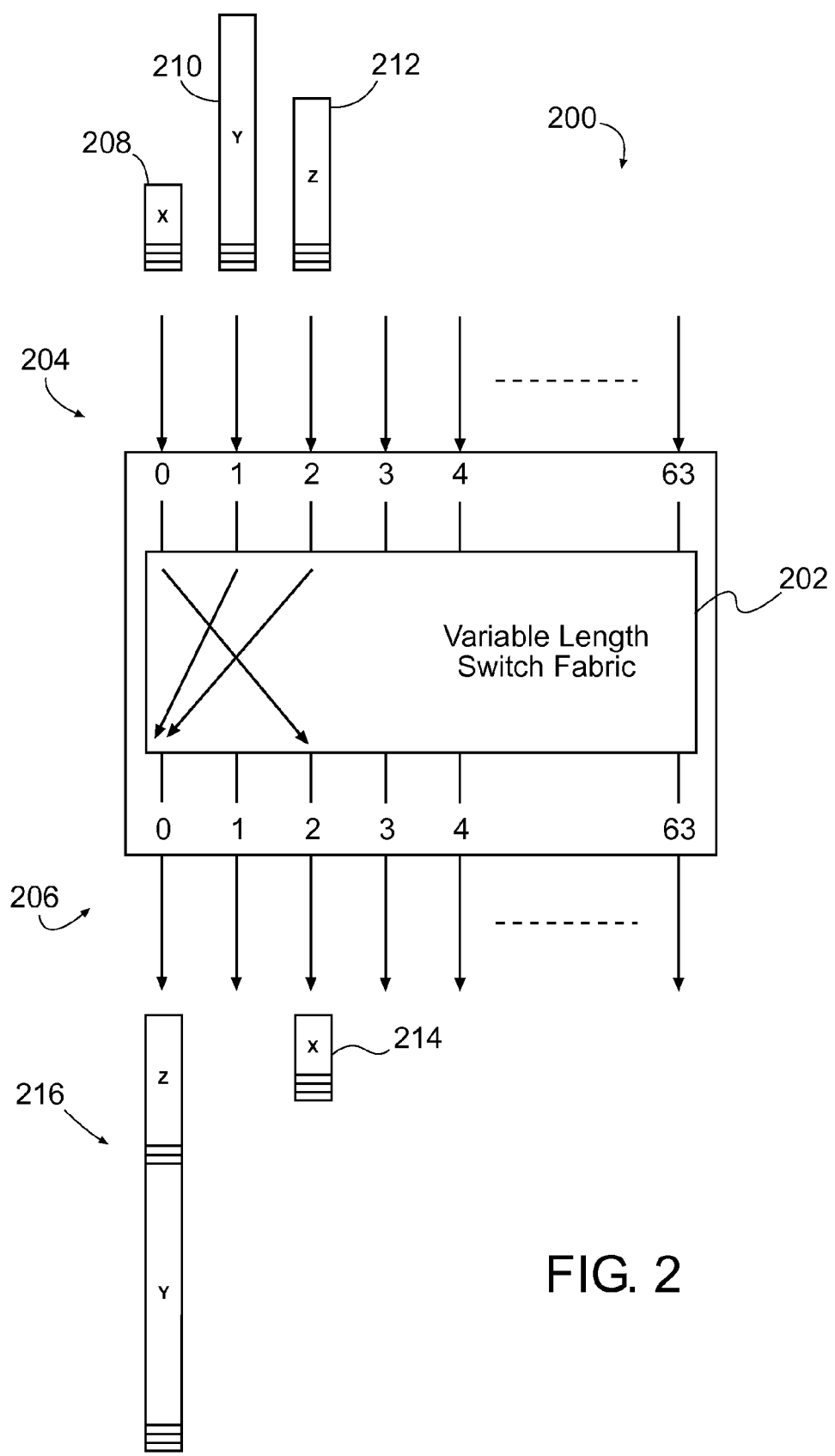
FIG. 2 shows a diagram of a switching device that includes a variable length switch fabric constructed in accordance with the present invention.

FIG. 2 shows a diagram of a switching device 200 that includes a variable length switch fabric 202 constructed in accordance with the present invention. The switch 200 includes sixty-four input ports 204 and sixty-four output ports 206. Although shown as a sixty-four-port switch, the switch 200 may have more or fewer ports without deviating from the scope of the invention. Data packets received at any one of the input ports 202 may be switched by the switch fabric 202 to any one of the output ports 206.

The switch fabric 202 allows variable length data packets to be switched without the need for zero filling or segmentation. For example, a first data packet X is input at port 0, as shown at 208. A second data packet Y is input at port 1, as shown at 210, and a third data packet Z is input at port 2, as shown at 212. The three data packets have different lengths— packet Y being large than packet Z and much larger that packet X. During operation of the variable length switch fabric 202, the data packets Y and Z are sent into the variable length switch fabric 202 and output from port 0 (as shown at 216). However, because the variable length switch fabric can switch packets having different lengths, neither packet was zero filled or segmented. As a result, packet Y is output at port 0 in its entirety followed by packet Z, which is output at port 0 in its entirety. Thus, the variable length switch fabric 202 provides efficient use of switch bandwidth, because it does not pad or zero-fill packets, and avoids the problems of reassembly associated with packet segmentation.

Figure 3:
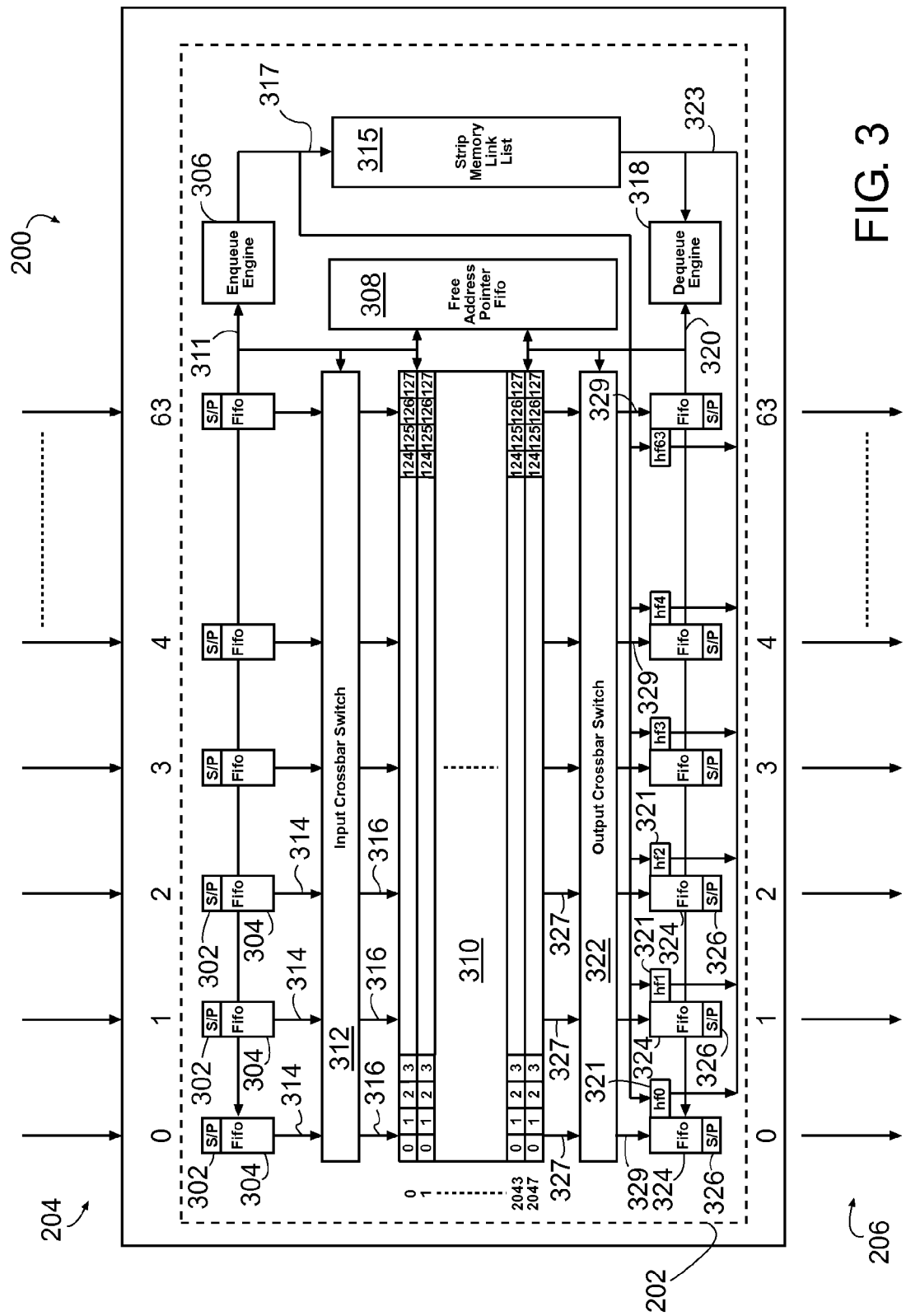
FIG. 3 shows a detailed diagram of the variable length switch fabric of FIG. 2.

FIG. 3 shows a detailed block diagram of one embodiment of the switching device 200 including the variable length switch fabric 202 constructed in accordance with the present invention. The sixty-four input ports 204 are capable of receiving variable length data packets in the form of high-speed serial data streams. For example, when used in a communication network, each of the sixty-four input ports may receive a serial data stream transmitted at a rate of approximately 2.5 gigabits per second (2.5 Gbps). However, it is possible that the switching device be used in other types of networks, where faster or slower data rates can be received by the switching device 200, and switched within the scope of the invention. Serial-to-parallel (S/P) converters 302 receive the serial data streams and convert the incoming data bits to data bytes. The input FIFO devices 304 receive the data bytes and act as temporary data storage.

An Enqueue engine 306 is coupled to the FIFO devices 304, a strip memory 310 and an input crossbar switch 312 via a write control bus 311. The write control bus 311 also couples the Enqueue engine to a free address pointer FIFO 308. The Enqueue engine 306 may be hardwired logic or may include a processor, for example, a processor that executes instructions stored in a program memory. The free address pointer FIFO 308 is use to store address pointers that are used to access available strips of the strip memory 310.

The input FIFOs 304 are coupled to the input crossbar switch 312 by input data buses, shown at 314. The input crossbar switch is a switch that operates to couple a switch input to a switch output. For example, the crossbar switch 312 has sixty-four switch inputs and sixty-four switch outputs. The crossbar switch 312 operates to couple any of the switch inputs to any of the switch outputs. The input crossbar switch 312 is further coupled to the strip memory 310 by switch outputs 316. The switch outputs 316 provide multiple connections from the input crossbar switch 312 to the strip memory 310, thereby providing multiple data paths over which data may flow from the crossbar switch 312 to the memory 310. Additional details describing the input crossbar switch and how it is coupled to the strip memory 310 are provided in another section of this document.

During operation of the switch fabric 202, when an input FIFO 304 meets a specific criteria, for example when an input FIFO fills with data to a selected fill level, the Enqueue engine, which monitors the input FIFOs for this criteria, obtains an address pointer from the address FIFO 308 that points to an available strip in the strip memory. The Enqueue engine uses this pointer to activate a data transfer operation, wherein data in the filled input FIFO is transferred via the crossbar switch 312 to the strip memory 310 and stored at the address specified by the retrieved address pointer. The Enqueue engine provides all the control commands necessary to control the input FIFOs 304, the input crossbar switch 312, and the strip memory 310, via the write control bus 311.

The Enqueue engine is also coupled to a strip memory link list 315 and a set of head pointer FIFOs 321 associated with each output FIFO, via a pointer bus 317. The link list 315 is a memory having at least the same number of elements as there are strips in the strip memory, so that there is at least one link list element for each memory strip.

After the Enqueue engine begins a memory transfer from a particular input FIFO to a particular memory strip, the Enqueue engine transmits the address pointer of the particular memory strip to a selected head pointer FIFO 321 that is associated with the output FIFO where the data is to be switched. If a variable data frame includes more data than can fit into a signal memory strip, so that additional strips are needed, the Enqueue engines writes the address pointers for these strips into the link list 315. The operations of the head pointer FIFOs 321 and the link list 315 are described in another section of this document.

The strip memory 310 comprises a read/write memory array. In the embodiment of the switch fabric 202 shown in FIG. 3, the strip memory includes 2048 memory strips where each memory strip has storage for 128 data bytes or 64 data words. Each data word is formed from two data bytes. As a result, the strip memory 310 represents a storage array of 262,144 bytes (2048.times.128). However, the size of the strip memory may vary and in other embodiments of the invention, the strip memory can be smaller or larger without deviating from the scope of the present invention. The strip memory operates to store variable length data packets so that they can be switched in accordance with the present invention. In general, the strip memory is large enough to store very large variable length data packets, however, the size of the strip memory can be adjusted to achieve specific switch performance.

Therefore, during operation of the switch fabric 202, the S/P converters 302 receive serial data to be switched between a selected input port (204) and a selected output port (206). The S/P converters 302 form parallel data flows through the input FIFOs 304 and into the strip memory 310 via the crossbar switch 312. The Enqueue engine retrieves free memory pointers from address pointer FIFO 308 and controls the write operation to the strip memory so that the data is written into selected strips of the strip memory. As part of the write operation, the Enqueue engine transmits the retrieved memory pointers to selected head pointer FIFOs 321 that are associated with each of the output ports (206) or the strip memory link list 315.

A Dequeue engine 318 is used to transfer the stored data from the strip memory to the output ports, and thereby effectuate the switching process. The Dequeue engine is coupled via a read control bus 320 to the address FIFO 308, the strip memory 310, an output crossbar switch 322, and a set of output FIFOs 314 that are associated with the output ports 206. The Dequeue engine is also coupled to the head pointer FIFOs 321 and the strip memory link list, via a read pointer bus 323. The Dequeue engine may include hardwired logic or may include a processor that executes instructions stored in a program memory.

The output crossbar switch 322 includes multiple inputs 327 and outputs 329, and operates so that any input may be coupled to any output. The head pointer FIFOs 321 operate to receive an initial address pointer to the strip memory from the Enqueue engine and make this pointer available to the Dequeue engine via the read pointer bus 323.

The Dequeue engine determines a read-out condition that indicates when data stored in the strip memory needs to be transferred to one of the output FIFOs 314. For example, in one embodiment, the Dequeue engine monitors the head pointer FIFOs to obtain address pointers that determine which memory strips have received data and are ready to be unloaded to specific output ports.

When the read-out indication occurs, the Dequeue engine transfers the contents of the indicated memory strip, via the output crossbar switch 322 to one of the output FIFOs 314 associated with a selected output port. For example, when the Dequeue engine obtains a strip address pointer from a head pointer FIFO 321 associated with a particular output FIFO 314, the Dequeue engine transfers the contents of the pointed to memory strip to the associated output FIFO 314.

In addition, the head pointer FIFO 321 is used to access the link list to obtain pointer information for additional memory strip to be unloaded. For example, a variable length data frame may contain more data than can fit into one memory strip. In this case, additional memory strips will be used and their associated pointers are stored in the link list 315. Only the pointer for the first memory strip is stored in the head pointer FIFO. Thus, every entry in the head pointer FIFO is associated with a different data frame and may be used in conjunction with the link list to unload the entire frame from the strip memory.

The Dequeue engine reads the pointer information in both the head pointer FIFO and the link list and accesses the strip memory and controls the output crossbar switch to transfer the data to the associated output FIFO. In this manner, data switching is achieved since data received at a selected input port 204 and stored in the strip memory is read from the strip memory and transferred to a selected output port 206.

Once the Dequeue engine empties a particular memory strip, the Dequeue engine takes the address pointer associated with that memory strip and pushes it onto the address FIFO 308. For example, the Dequeue engine transfers the contents of memory strip 2 to the output FIFO associated with output port 3, and then the Dequeue engine pushes an address pointer that points to memory strip 2 onto the address FIFO 308. During operation of the switch fabric 202, as the Dequeue engine unloads each memory strip, the associated address pointers are pushed onto the address FIFO 308, so that the Enqueue engine 306 may retrieve these pointers and reuse the strip memory. In this way, the memory strips are continuously reused during operation of the switch fabric 202.

In certain cases, the received data is stored in less than a full memory strip. For example, if the received data packet length is smaller than the memory strip length, then only a portion of a memory strip will be used to store the packet data. Furthermore, in cases where the received packet is larger than the length of the memory strip, one or more memory strips may be used to store the receive packet with the last portion of the packet stored in less than a full memory strip. In these cases, both the Enqueue and the Dequeue engines operate to switch the correct amount of data.

With respect to the Enqueue engine, for every complete memory strip used to store data, the associated memory strip address pointer is transferred by the Enqueue engine to the appropriate read address FIFO. Thus, in the process described above, the Dequeue engine will operate to unload the completely full memory strip to the selected output port.

In a case where only a portion of a memory strip is used to store data, for example if the last strip used to store data is not completely full, then the Enqueue engine stores a last strip (LS) indicator and a count value in the link list. The Dequeue engine reads the above information from the head FIFO 321 and the link list and begins to unload the memory strip based on the count value so that the exact amount of data is unloaded. Thus, it is possible to use only portions of the memory strips to allow variable length frames to be switched without any padding or zero-filling.

The output FIFOs 314 are coupled to parallel-to-serial (P/S) converters 316 that convert the data from bytes to a serial bit stream for serial transmission from the output ports 206. The transmission of data from the output ports 206 occurs at the same transmission rate as the data is received at the input ports 204. As a result, data may be received and transmitted from the switch at the same data rate; however, the switching operation and the use of the strip memory 310 may introduce some small amount of data latency.

Figure 4:
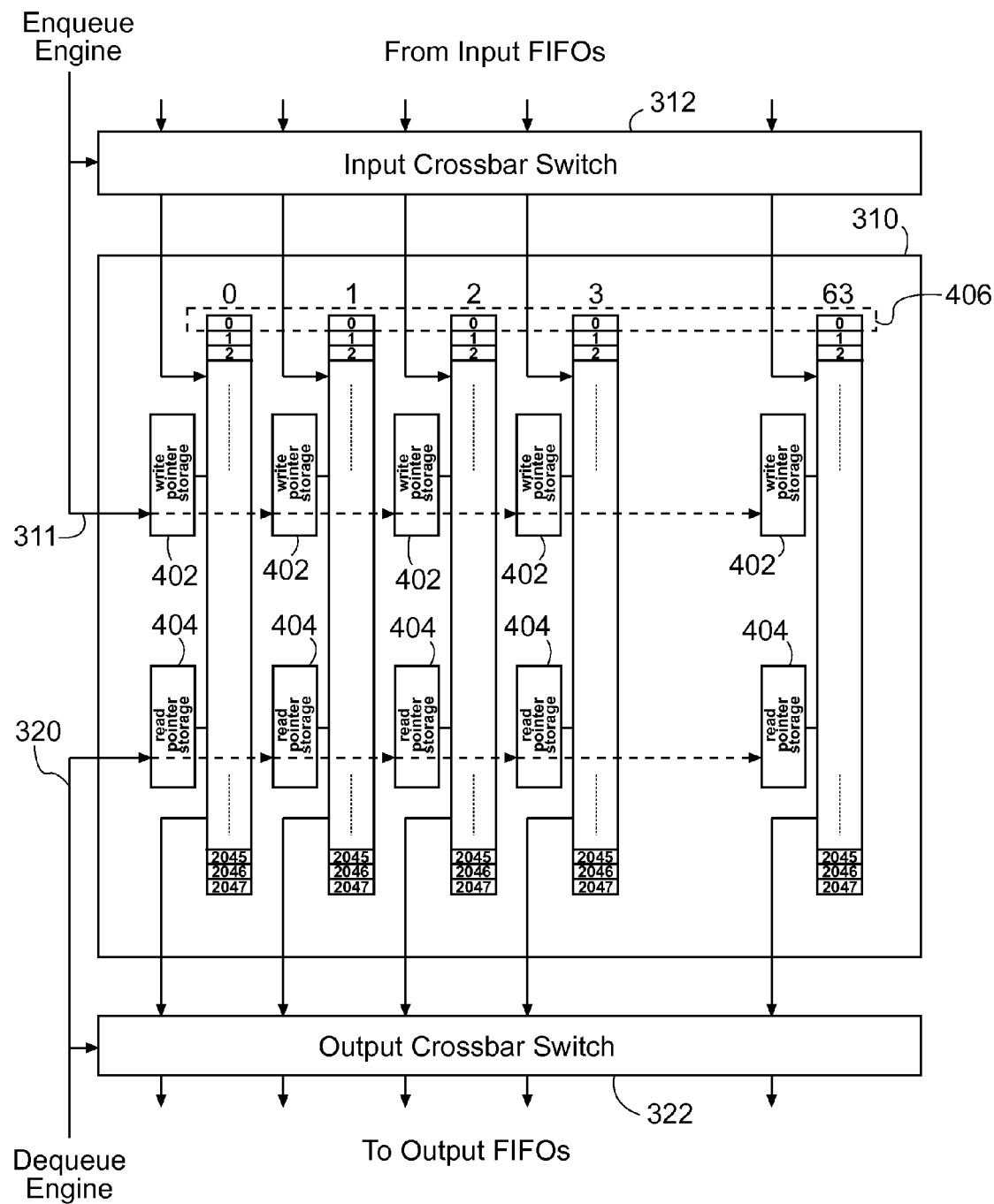
FIG. 4 shows an exemplary embodiment of a strip memory constructed in accordance with the present invention.

FIG. 4 shows an exemplary embodiment of the strip memory 310 constructed in accordance with the present invention. As described in the embodiment above, the strip memory forms a memory array of (2048.times.128) storage locations. In one embodiment, this memory array is formed from sixty-four individual memories (0-63) that contain 2048 storage locations. Each of the memories includes logic for write pointer storage 402 and read pointer storage 404. The write pointer storage 402 receives write control information from the Enqueue engine via the write control bus 311. The write control information includes write addresses that are used to write data into the memories. The write control bus 311 is coupled to write pointer storage for all the memory arrays to provide addresses and control for data to be written into the memories from the input crossbar switch 312.

The read pointer storage 404 receives read control information from the Dequeue engine via the read control bus 320. The read control information includes read addresses that are used to read data from the memories. The read control bus 320 is coupled to read pointer storage for all the memory arrays to provide addresses and control for data to be read from the memories to the output crossbar switch 322.

In one embodiment, the memory strips are formed by grouping individual locations in each memory element into one memory strip. For example, all location 0 memory locations are group together to form memory strip 0. In the same manner, the other memory locations are grouped together to form the other memory strips. As a result, the memory strips are formed horizontally across the memory arrays as shown by memory strip 0 at 406.

Figure 5A:
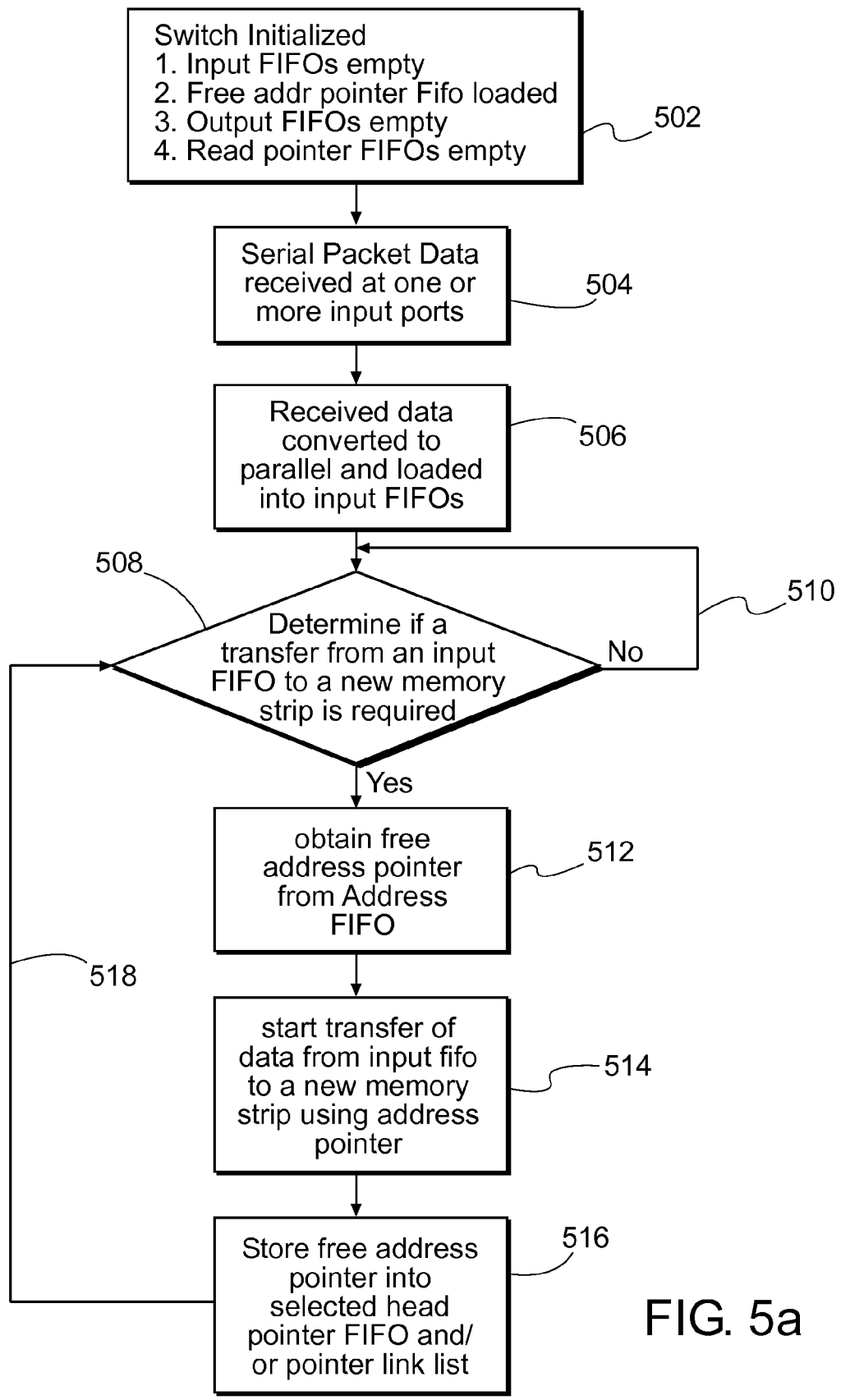
FIGS. 5a-b show flow diagrams illustrating a method for providing a variable length switch fabric in accordance with the present invention.
Figure 5B:
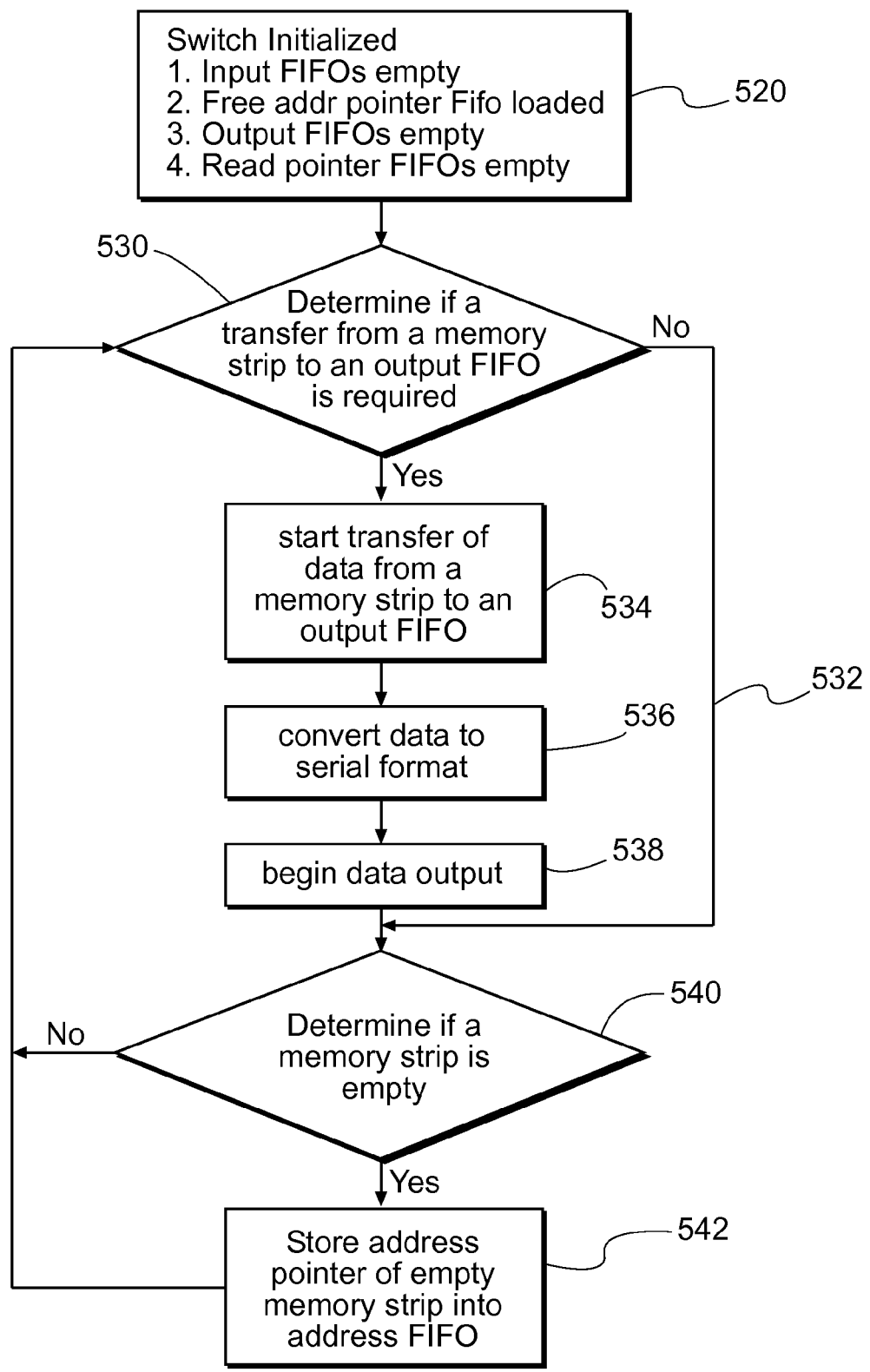

FIGS. 5a-b show associated flow diagrams illustrating a method for providing a variable length switch fabric in accordance with the present invention. FIG. 5a shows a method for inputting variable length data to a variable length switch fabric in accordance with the present invention. FIG. 5b shows a flow diagram for outputting variable length data from a variable length switch fabric, and thereby switching data in accordance with the present invention.

Referring to FIG. 5a, a method for inputting variable length data to a variable length switch fabric is shown. At block 502 the fabric is initialized, for example, a power up sequence is performed. For example, during the initialization of the switch fabric 202, the input FIFOs 304, the output FIFOs 314, and the read pointer FIFOs 321 are emptied. The address FIFO 308 is loaded with default address pointers that point to all the memory strips, since at initialization all memory strips are available. However, it is also possible that any other default address pointer configurations or arrangements are loaded into the address FIFO 308. For example, by loading the address FIFO with address pointers arranged in a specific order or by loading only a portion of the address pointers, the strip memory 310 may be accessed or utilized in specific ways.

At block 504, variable length packet data is received at one or more input ports (0-63) of a variable length switch, for example, the variable length switch 200. The variable length data is required to be switched to one or more output ports. The data may be in the form of a serial bit stream that is received at very high transmission rate, for example, 2.5 Gbps.

At block 506, the received serial data is converted to parallel data. For example, the serial bit streams of the input data are converted to 16-bit words. The parallel data is then loaded into input FIFOs, (i.e., input FIFOs 304) for temporary buffering.

At block 508, a determination is made to determine whether data in any particular input FIFO should be transferred to the strip memory. For example, if an input FIFO reaches a selected fill level, the data is transferred to the strip memory. In one embodiment, the selected fill level occurs when enough data is contained in an input FIFO to fill one memory strip. In another embodiment, the selected fill level occurs when an input FIFO contains a complete data packet. It is also possible to use any other criteria to determine when data in a selected input FIFO should be transferred to the strip memory. Thus, it is not necessary to have enough data in the input FIFO to fill one memory strip before transferring data to the strip memory.

If the determination is made that no input FIFO has met the criteria for transferring data to the strip memory, the method proceeds along path 510 effectively waiting for at least one input FIFO to meet the transfer criteria. If the determination is made that at least one input FIFO contains enough data to meet the transfer criteria, the method proceeds to block 512.

At block 512, assuming data is to be written from at least one input FIFO to the strip memory, a strip memory pointer is retrieved that indicates where in the strip memory the input FIFO data is to be transferred. For example, the Enqueue engine obtains the strip memory pointer from the address FIFO 308.

At block 514, a data transfer begins so that data in the input FIFO is transferred to a strip memory location identified by the retrieved strip memory pointer. For example, the Enqueue engine begins a data transfer that transfers data from the input FIFO to the strip memory location specified by the retrieved pointer. The Enqueue engine sets up the data transfer so that a selected amount of data is transferred into one memory strip. For example, the transfer may completely fill one or more memory strips, or the transfer may fill only a portion of a memory strip. To accomplish the transfer, the Enqueue engine uses the write control bus 311 to control operation of the specific input FIFO, the input crossbar switch 312, and the strip memory.

At block 516, for each memory strip used, the associated memory pointer is stored in the head pointer FIFO associated with the output FIFO of the output port to which the data is to be switched. For example, if data received at input port 0 is to be switched to output port 2, then when the data is entered into the strip memory, the address of the strip memory is loaded into the head pointer FIFO associated with output port 2.

As data is transferred into the memory strips, it may be necessary to use more than one memory strip to store a variable length data frame. In this case, the pointer for the first memory strip is stored in the head pointer FIFO and the pointer for any additional memory strips are stored in a link list memory. The link list memory contains the same number of elements as there are memory strips and is used to form a list of memory strips used to store each data frame. A more detailed discussion about the use of the link list is provided in another section of this document.

After one or more transfers are started from the input FIFOs to the strip memories and the associated strip memory pointers are written into either the head pointer FIFOs or the link list, the method proceeds via path 518 to block 508 where a determination is made to determine if any more input FIFOs meet the criteria for transferring their data into the strip memory.

The method for inputting variable length data to a variable length switch fabric described above is operable to perform the above steps for multiple input FIFOs simultaneously. For example, it may be determined at block 508 that three input FIFOs meet the transfer criteria. In this case, at block 512, three address pointers will be retrieved and at block 514, three transfers will be initiated that transfer the data from the three input FIFOs to three memory strips. In addition, the address pointers of the memory strips will be written into the head pointer FIFOs (associated with the output FIFOs) or corresponding entries in the link list memory.

Therefore, during operation of the variable length switch fabric, blocks 502 through 516 describe how the switch fabric operates for receiving variable length data and transferring the data to the strip memory. For example, the switch fabric continuously receives variable length packet data as input, converts the data into a parallel format and inputs the data into input FIFOs, determines when the input FIFOs meet the transfer criteria, obtains strip memory address pointers, initiates transfers of data from the input FIFOs to the strip memory, and writes the memory pointers into the head pointer FIFOs associated with output ports or corresponding entries in the memory link list.

Referring to FIG. 5b, there is shown an output process for removing data from the strip memory included in the variable length switch fabric and switching the data to a desired output port in accordance with the present invention. At block 520, it will be assumed that the initialization process described at block 502 above has already occurred, wherein the output FIFOs 314 and the head pointer FIFOs 321 are emptied.

At block 530, a determination is made to determine if a transfer of data from the strip memory to an output FIFOs is required. For example, a transfer criterion can be specified to determine that such a data transfer is required. One transfer criteria that can be specified is that a new address pointer has been loaded into a head pointer FIFO associated with an output port. This condition indicates that there is data in the strip memory that is to be transferred to the selected output port. The Dequeue engine can poll the head pointer FIFOs to determine this condition. Another transfer criteria may be that a particular strip memory is full or that a particular strip memory is ready to transfer its data even though it is only partially full.

If a determination is made that no memory strip has met the criteria for transferring data to an output FIFO, the method proceeds along path 532 to perform other tests described below. If a determination is made that at least one memory strip meets the transfer criteria, the method proceeds to block 534.

At block 534, for each memory strip that meets the transfer criteria a transfer of data from the memory strip to a selected output port is initiated. For example, a head pointer FIFO associated with an output port contains an address of a memory strip that contains data to transfer to that particular output port. The Dequeue engine determines this condition and begins a transfer to the data from the memory strip to the output FIFO associated with the output port. The Dequeue engine controls the output crossbar switch so that the data may flow to the desired output FIFO.

The Dequeue engine also checks the link list memory to determine if there is data in other memory strips to be transferred to the output FIFO. A detailed description of the operation of the link list memory is provided in another section of this document.

At block 536, data transferred to an output FIFO is converted to serial format, and at block 538, the serial data is transmitted on the transmission path associated with that output port. Thus, the data is effectively switched from an input port to a selected output port.

At block 540, a determination is made to determine if there are any memory strips that have transferred out all their stored data and are now empty. These memory strips may be reused to store new incoming packet data. For example, the Dequeue engine determines if any previously allocated memory strips have become available.

At block 542, address pointers corresponding to any unused memory strips determined in block 540 are pushed onto the address FIFO. For example, the Dequeue engine determines whether any previously used memory strips have become available and pushes an address pointer for these memory strips onto the address FIFO. This allows the Enqueue engine to reuse these memory strips when the address pointers are removed from the address FIFO during the input process that transfers data into the strip memory as described with reference to FIG. 5a.

Therefore, during operation of the switch fabric, blocks 530 through 542 describe how variable length packet data stored in the strip memory is transferred to a desired output port, and how the data is converted to serial format and output over the new transmission path associated with the output port. In addition, address pointers for previously used memory strips are pushed onto the address FIFO for reuse. Thus, the methods for performing the input and output processes described above continuously operate to provide a variable length switch fabric that receives and switches variable length packet data without the need to zero fill or segment the data.

Exemplary Operation

The following text describes exemplary operation of one embodiment of a variable length switch fabric constructed in accordance with the present invention.

Figure 6:
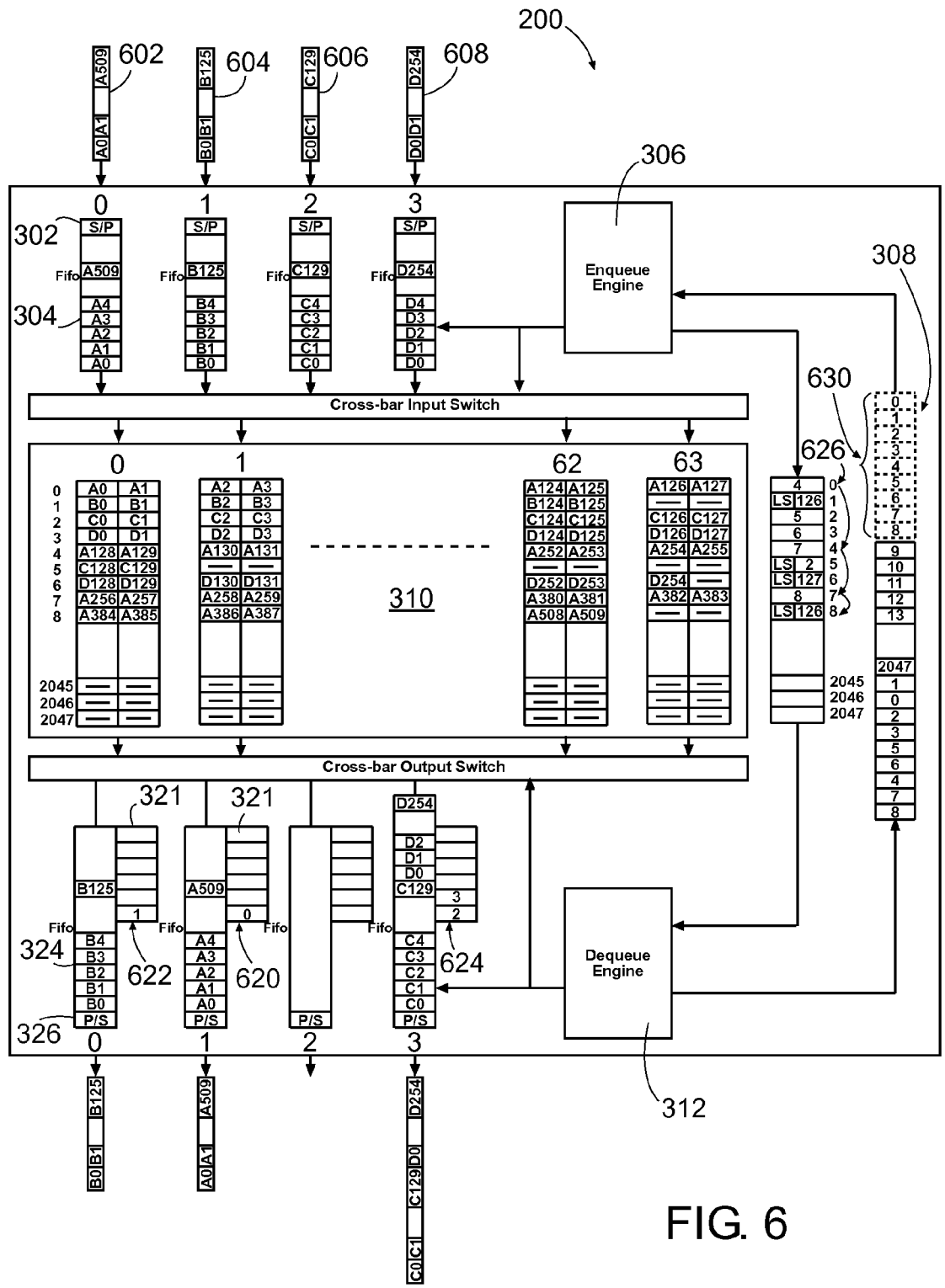
FIG. 6 illustrates exemplary operation of a variable length switch fabric in accordance with the present invention.

FIG. 6 shows relevant portions of the switch 200 and demonstrates how four data packets having different length and received at switch inputs 0-3 are switched to output ports 0-3 utilizing the variable length switch fabric in accordance with the present invention. Shown in FIG. 6 are four input data packets 602, 604, 606 and 608 that arrive at the switch 200 in serial format at ports 0-3, respectively. For example, "A0" shown in packet 602 represents a serial bit stream of eight bits that form one byte. The data packets contain varying amount of data. For example, data packet 602 contains 510 bytes of "A" data, packet 604 contains 126 bytes of "B" data, packet 606 contains 130 bytes of "C" data, and packet 608 contains 255 bytes of "D" data.

The data packets are received at each input port by serial-to-parallel converters 302 and converted to parallel byte data. The byte data is then entered into input FIFOs 304 that temporarily buffer the incoming data. When any of the input FIFOs meet a selected transfer criteria (i.e., data fill level) the Enqueue engine initiates a transfer to transfer the data in the input FIFO to the strip memory 310.

The Enqueue engine 306 detects that one or more FIFOs have met the transfer criteria and at that point, the Enqueue engine retrieves an pointer address from the address FIFO 308 and uses this address to transfer data from an input FIFO to the strip memory. For example, assuming that the FIFO receiving the A data at input port 0 meets the transfers criteria first, then the Enqueue engine would operate to begin a transfer of data from the input FIFO associated with input port 0 to the strip memory pointed to by address 0, which is the first entry to be retrieved from the address FIFO 308. The transfer is seen by reviewing the strip memory 310, wherein it can be seen that data A0-A127 have been transferred to memory strip 0.

After the "A" data transfer is initiated, the Enqueue engine writes the pointer address of the memory strip into the head pointer FIFO associated with the output port where the data A is to be switched. For example, the address for memory strip 0 is written into the head pointer FIFO associated with output port 1, as shown at 620.

Assuming that the input FIFO receiving "B" data next meets the transfer criteria, the Enqueue engine then retrieves the next pointer from the address FIFO, which is pointer 1, and uses this pointer to transfer B data to the strip memory. As can be seen, memory strip 1 contains data B0-B125. This is the entire B data packet so the remaining two memory locations in memory strip 1 will go unused.

After the data B transfer is initiated, the Enqueue engine writes the pointer address of the memory strip into the head pointer FIFO associated with the output port where the data B is to be switched. For example, the address for memory strip 1 is written into the head pointer FIFO associated with output port 0, as shown at 622. Furthermore, the fact that the B data does not fill an entire strip is indicated by a last strip (LS) indicator and a word count of 126 that is stored in the link list at location 1, as shown.

Assume now that while A and B data are being transferred to the strip memory, the input FIFO receiving C data now meets the transfer criteria. The Enqueue engine then retrieves the next strip pointer (2) from the address FIFO 308 and begins a transfer of C data to the memory strip 2. As a result, C data (C0-C127) is written into memory strip 2. Assume the same process occurs to receive D data so that D data (D0-D127) is transferred into memory strip 3 as shown.

After the data C and D transfers are initiated, the Enqueue engine writes the pointer address of the memory strips into the head pointer FIFOs associated with the output ports where the data C and D are to be switched. For example, the address for memory strip 2 is written into the head pointer FIFO associated with output port 3 and the address of the memory strip 3 is written into the head pointer FIFO associated with output port 3, as shown at 624.

However, A, C and D data packets are so long that they cannot fit into one memory strip. In this case, the Enqueue engine operates to allocate additional memory strips for the storage of these packets. For example, after the first transfer of A data to the strip memory, the input FIFO receiving A data receives enough new A data to meet the transfer criteria again. The Enqueue engine responds by retrieving another memory pointer from the address FIFO 308 and initiating another transfer of A data to the strip memory. For example, memory strip 4 is used to store (A128-A255) as shown. After this transfer, the Enqueue engine writes the strip memory pointer into the link list at location 0 as shown. Thus, the 0 in the head pointer FIFO shown as 620 operates to tell the Dequeue engine that A data is stored in memory strip 0 and that location 0 of the link list can be used to find additional A data. For example, location 0 in the link list now contains a 4 to indicate that memory strip 4 contains additional A data.

Packets C and D are also allocated additional strip memory in a manner similar to that of packet A. As a result, memory strip 5 is used to store (C128-C129) and memory strip 6 is used to store (D128-D254). Thus, a 5 is placed in the link list memory at location 2 and a 6 is placed in the link list memory at location 3. Furthermore, since these strips are only partial filled, the link list contains LS indicators and byte counts at locations 5 and 6. Thus, memory strip 5 contains 2 bytes to complete C data and memory strip 6 contains 127 bytes to complete D data.

Even though packets B, C and D have been placed in the strip memory, packet A needs to be allocated two more memory strips so that memory strip 7 contains (A256-A383) and memory strip 8 contains (A384-A509). Corresponding to this, the link list contains an 8 in location 7 and an LS indicator and byte count of 126 at location 8.

At this point all of the incoming data frames have been stored in the strip memory and the corresponding memory pointers are loaded into the head pointer FIFOs and the link list. Next, a description of how the packet data is removed from the strip memory will be provided.

For the purposes of clarity, address FIFO 308 shows a first portion 630 that represents the first eight strip memory pointers that were retrieved to store the incoming variable length data.

The Dequeue engine 312 now operates to determine when data in the memory strips may be transferred to the output FIFOs. For example, data may be transferred when the Dequeue engine detects an address in one of the head pointer FIFOs. For example, the Dequeue engine detects the pointer address of 1 in the head pointer FIFO associated with port 0. The Dequeue engine then begins a transfer from memory strip 1 to the output FIFO associated with port 0. The Dequeue engine reads the link list location 1 and finds an LS indicator and a byte count of 126. Thus, the Dequeue engine knows to transfer 126 bytes from memory strip 1 to the output FIFO associated with the output port 0.

As a result transferring the data from memory strip 1 to the output FIFO 314 associated with port 0, the output FIFO contains the B data and can begin outputting it on the desired output transmission path. The B data is output in a fashion identical to how it was received. For example, the B data is output in the same order as received, i.e., starting with B0 and continuing through to B125. Also, each byte of the B data is converted to serial format by the parallel-to-serial converters 316, so that the output of B data forms a serial bit stream having a data rate identical to what was received at the input port 1, i.e., 2.5 Gbps.

Another result of transferring B data from the memory strip 1 to the output FIFO is that the memory strip 1 becomes empty. The Dequeue engine detects this condition and pushes the address pointer for the memory strip 1 onto the address FIFO 308. For example, the address 1 is shown below the last strip address 2047 in the address FIFO. Should the Enqueue engine use the address pointers through to 2047, the address 1 will be come available to allow memory strip 1 to be reused. In this embodiment, the address pointers cycle through the address FIFO in a round robin fashion. However, it is also possible to have other address pointer reuse techniques to allow reuse of empty memory strips. For example, multiple address pointer FIFOs could be used to allow a specific memory strip allocation implementation.

All of the data for the remaining packets is handled in a manner similar to that of B data. For example, A data gets transferred to output port 1, C data gets transferred to output port 3 and D data gets transferred to output port 2. The Dequeue engine detects memory strip pointers in the head FIFOs and begins transfers of data from the memory strips to the appropriate output FIFO. The Dequeue engine also checks the link list at a location corresponding to the memory strip pointer to determine how much data to transfer. For example, the head pointer associated with output FIFO 1 includes the memory pointer 0 indicating that memory strip 0 contains "A" data to be transferred to that output port. The Dequeue engine begins to transfer A data from the strip memory location 0 to the output FIFO associated with port one. The Dequeue engine checks location 0 in the link list and finds a 4, meaning that data in memory strip 4 is to be transferred to port one also. The Dequeue engine then checks the link list at location 4 and finds a 7, meaning that data stored in memory strip 7 is also to be transferred to port one. The Dequeue engine next checks link list location 7 and finds an 8, meaning that data stored in memory strip 8 is also to be transferred to port one. Finally the Dequeue engine checks link list location 8 and finds an LS indicator and a byte count of 126, meaning that 126 bytes of data are to be transferred from memory strip 8 to port 1. The flow of the Dequeue engine checking the various link list locations is shown at xxx.

As each strip becomes empty, the Dequeue engine pushes the address pointer for the strip onto the address FIFO 308, so that the Enqueue engine may reuse the strip if needed. Notice that the address pointer FIFO 308 contains address pointers that are not in the order in which the Enqueue engine removed them. This is because the pointers get placed onto the address FIFO 308 in the order that they become available. For example, the A data packet is very long and is shown utilizing 4 different memory strips. If the memory strips 7 and 8 are the last strips to transfer their data to output FIFOs then the corresponding address pointers will be the last to be pushed onto the address FIFO 308, as shown. However, notice that address pointer 0 was removed from the address FIFO before pointer 1, but memory strip 0 became empty after memory strip 1, so that address pointer 1 has been pushed onto the address pointer prior to address 0. In this manner, the address pointers may change order as they are used, since their order on the address FIFO is dependent on when they become available for reuse.

The above example describes a very orderly process for receiving and switching variable length data packets using one embodiment of a variable length switch fabric in accordance with the present invention. However, in actual use, the process of transferring the data into the strip memory and transferring data out of the strip memory may overlap. As a result, the operation of the variable length switch fabric becomes free-flowing in that variable length data packets may arrive at different times, and flow in and out of the strip memory in an overlapping process that is controlled by the Enqueue and Dequeue engines.

The present invention includes a variable length switch fabric for switching variable length data packets in a data network. The embodiments described above are illustrative of the present invention and are not intended to limit the scope of the invention to the particular embodiments described. Accordingly, while several embodiments of the invention has been illustrated and described, it will be appreciated that various changes can be made therein without departing from the spirit or essential characteristics thereof. Accordingly, the disclosures and descriptions herein are intended to be illustrative, but not limiting, of the scope of the invention which is set forth in the following claims.

The invention claimed is:

1. A switch fabric for switching variable length data packets between input and output transmission paths without padding or additional segment header information, the switch fabric comprising:

a strip memory comprising a plurality of memory strips, the capacity of each memory strip equal to a memory strip length;

a link list to store a plurality of entries respectively associated with the plurality of memory strips; and an enqueue engine to store the variable length data packets received via the input transmission paths into the memory strips, wherein, when a length of a short data packet does not exceed the memory strip length, the enqueue engine stores the short data packet in one selected memory strip, and stores, in the link list entry associated with the one selected memory strip, an indication that the one selected memory strip stores the last portion of the short data packet and a length of the stored short data packet; and wherein, when a length of a long data packet exceeds the memory strip length, the enqueue engine stores the long data packet in two or more selected memory strips, and stores, in the link list entry associated with each of the two or more selected memory strips except a last memory strip storing the end of the long packet, an address pointer to another of the two or more selected memory strips that stores a subsequent portion of the data packet, and stores, in the link list entry associated with the last memory strip, an indication that the last memory strip stores the last portion of the long data packet and a length of the stored portion of the long data packet.

2. A method for switching variable length data packets between input and output transmission paths without padding or additional segment header information, comprising:

temporarily storing data packets received via the input transmission paths in a strip memory comprising a plurality of memory strips, the capacity of each memory strip equal to a memory strip length, each memory strip associated with a respective one of a plurality of entries in a link list; and transferring stored data packets from the strip memory to the output transmission paths wherein, when a length of a short data packet does not exceed the memory strip length, storing data packets further comprises:

storing the short data packet in one selected memory strip, and storing, in the link list entry associated with the one selected memory strip, an indication that the one selected memory strip stores the last portion of the short data packet and a length of the stored short data packet, and wherein, when a length of a long data packet exceeds the memory strip length, storing data packets further comprises:

storing the long data packet in two or more selected memory strips, storing, in the link list entry associated with each of the two or more selected memory strips except a last memory strip storing the end of the long packet, an address pointer to another of the two or more selected memory strips that stores a subsequent portion of the data packet; and storing, in the link list entry associated with the last memory strip, an indication that the last memory strip stores the last portion of the long data packet and a length of the last portion of the long data packet stored in the last memory strip.

3. The switch fabric of claim 1, further comprising:

a plurality of input first-in-first-out (FIFO) memories to receive variable length packets from corresponding input transmission paths; and an input crossbar switch to transfer variable length packets from the input FIFO memories to the strip memory under control of the enqueue engine.

4. The data switch of claim 3, wherein
the enqueue engine initiates the transfer of data from a given input FIFO memory to the strip memory when enough data is contained in the given input FIFO memory to fill one memory strip.

5. The data switch of claim 3, wherein
the enqueue engine initiates the transfer of data from a given input FIFO memory to the strip memory when the given input FIFO memory contains a complete data packet.

6. The data switch of claim 3, further comprising a serial to parallel converter between each input transmission path and the corresponding input FIFO memory.

7. The switch fabric of claim 3, further comprising:
a plurality of output FIFO memories to receive packets from the strip memory, the output FIFO memories further to transmit packets over corresponding output transmission paths; and
a plurality of head pointer FIFO memories, each head pointer FIFO memory associated with a respective one of the output FIFO memories,
wherein, when the enqueue engine stores a variable length packet in the strip memory, the enqueue engine stores a pointer to a memory strip containing the head end of the stored variable length packet in a head pointer FIFO memory associated with a destination output FIFO memory that will received the stored variable length packet.

8. The data switch of claim 7, further comprising a parallel to serial converter between each output FIFO memory and the corresponding output transmission path.

9. The switch fabric of claim 7, further comprising:
an output crossbar switch to transfer variable length packets from the strip memory to the output FIFO memories under control of a dequeue engine.

10. The switch fabric of claim 9, wherein the dequeue engine initiates a transfer of the variable length packet from the strip memory to the destination output FIFO memory when a new address pointer has been loaded into the head pointer FIFO memory associated with the destination output FIFO memory.

11. The data switch of claim 9, wherein
the dequeue engine polls the plurality of head pointer FIFO memories to determine if there is data in the strip memory to be transferred to the output FIFO memories.

12. The data switch of claim 9, wherein
the dequeue engine initiates a transfer of the variable length packet from the strip memory to the destination output FIFO memory when the selected memory strip is full.

13. The data switch of claim 9, wherein
the dequeue engine determines when data stored in the strip memory needs to be transferred to one of the output FIFO memories.

14. The data switch of claim 9 further comprising
a free address FIFO memory for storing address pointers of free memory strips.

15. The data switch of claim 14, wherein
when a variable length packet is transferred from a selected memory strip to an output FIFO memory, the dequeue engine pushes an address pointer to the selected memory strip to the free address FIFO memory.

16. The data switch of claim 14, wherein
the enqueue engine obtains address pointers from the free address FIFO memory for storing data variable length packets to free memory strips.

17. The method for switching variable length data packets of claim 2, further comprising:
holding received variable length packets in a plurality of input first-in-first-out (FIFO) memories corresponding to the input transmission paths; and
transferring variable length packets from the input FIFO memories to the strip memory via an input crossbar switch.

18. The method for switching variable length data packets of claim 17, wherein
transferring data from a given input FIFO memory to the strip memory is initiated when enough data is contained in the given input FIFO memory to fill one memory strip.

19. The method for switching variable length data packets of claim 17, wherein
transferring data from a given input FIFO memory to the strip memory is initiated when the given input FIFO memory contains a complete data packet.

20. The method for switching variable length data packets of claim 17, further comprising:
transferring packets from the strip memory to a plurality of output FIFO memories; and
transmitting packets from the output FIFO memories over corresponding output transmission paths.

21. The method for switching variable length data packets of claim 20, further comprising: transferring variable length packets from the strip memory to the output FIFO memories via an output crossbar switch.

22. The method for switching variable length data packets of claim 20, further comprising:
when a variable length packet is stored in the strip memory, storing a pointer to a memory strip containing the head end of the stored variable length packet in a head pointer FIFO memory associated with a destination output FIFO memory that will received the stored variable length packet.

23. The method for switching variable length data packets of claim 20, wherein transferring a variable length packet from the strip memory to a destination output FIFO memory is initiated when a new address pointer has been loaded into the head pointer FIFO memory associated with the destination output FIFO memory.

24. The method for switching variable length data packets of claim 23, further comprising:
polling the plurality of head pointer FIFO memories to determine if there is data in the strip memory to be transferred to the output FIFO memories.

25. The method for switching variable length data packets of claim 20, wherein
transferring a variable length packet from the strip memory to a destination output FIFO memory is initiated when the selected memory strip is full.

26. The method for switching variable length data packets of claim 20 further comprising:
when a variable length packet is transferred from a selected memory strip to an output FIFO memory, pushing an address pointer to the selected memory strip to a free address FIFO memory for storing address pointers of free memory strips.

27. The method for switching variable length data packets of claim 26, further comprising:
obtaining address pointers from the free address FIFO memory for storing variable length packets to free memory strips.

* * * * *